United States Patent

[11] 3,553,478

[72] Inventors Heinz-Dieter Steinbacher;
Wilhelm Graffenberger, Hamburg, Germany

[21] Appl. No. 702,050
[22] Filed Jan. 31, 1968
[45] Patented Jan. 5, 1971
[73] Assignee U. S. Philips Corporation
New York, N.Y.,
a corporation of Delaware by mesne assignments
[32] Priority Feb. 4, 1967
[33] Germany
[31] No. P41346

[54] PULSE GENERATOR
6 Claims, 1 Drawing Fig.

[52] U.S. Cl. .... 307/108, 315/27
[51] Int. Cl. .... H01j 29/70
[50] Field of Search .... 315/27, 29; 307/108—132, 228

[56] References Cited

UNITED STATES PATENTS

| | | | |
|---|---|---|---|
| 3,293,486 | 12/1966 | Nicholson | 307/228X |
| 3,374,439 | 3/1968 | Hickey | 307/228X |
| 3,184,616 | 5/1965 | Bates et al | 315/27X |
| 3,205,401 | 9/1965 | Fyler et al | 315/27 |
| 3,271,617 | 9/1966 | Boekhorst | 315/27 |
| 3,287,596 | 11/1966 | Rhodes et al | 315/27 |
| 3,411,031 | 11/1968 | Dean | 315/27 |

*Primary Examiner*—Robert K. Schaefer
*Assistant Examiner*—T. B. Joike
*Attorney*—Frank R. Trifari

ABSTRACT: A sweep generator in which the forward conduction of an intermittently operated positive feedback path including a transistor and a pentode is maintained by the discharge of a grounded capacitor connected in the base circuit of the transistor. A biased diode is connected between this capacitor and the base terminal of the transistor to block current from flowing through the capacitor in response to an external synchronization signal applied to the base of the transistor.

PATENTED JAN 5 1971 3,553,478
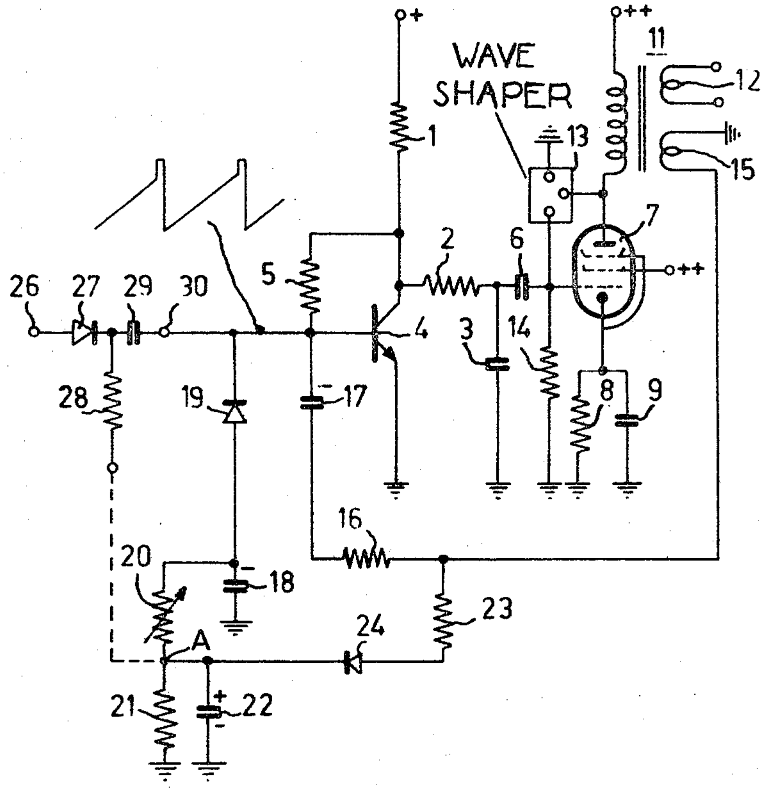
INVENTORS
HEINZ-DIETER STEINBACHER
WILHELM GRAFFENBERGER
BY
Frank R. Trifari
AGENT

PULSE GENERATOR

The invention relates to a pulse generator circuit arrangement in which a charged capacitor connected to the control path of a reverse biased amplifier element is periodically linearly discharged by a voltage of opposite polarity. When a particular value of the capacitor voltage is reached the amplifier element becomes forward-biased, thereby producing a pulse by which the capacitor is rapidly charged to its original potential as a result of a rectifier in the control path.

In such a circuit arrangement for good frequency stability a close coupling is necessary between the capacitor and the amplifier element. On the other hand a sychronization pulse supplied against a ground reference potential would be strongly loaded by the capacitor. This loading affect could moreover have an undesired influence on the charging condition of the capacitor and could adversely influence the stability of the circuit.

In a circuit arrangement of the type mentioned in the preamble these drawbacks are avoided if, according to the invention, a rectifier element which is conductive for the charging pulses but is cut off by the synchronization pulses is connected between the first capacitor and the control path.

In order that the invention may be readily carried into effect, one embodiment thereof will now be described in greater detail, by way of example, with reference to the accompanying drawing, the sole FIG. of which shows a pulse generator circuit. In this circuit a tube output stage is controlled by a transistor prestage. The output stage supplies a current for the vertical deflection coils of a colour television receiver.

From the positive terminal + of a first voltage source, a capacitor 3 of 82 $\mu f$ is charged through an adjustable resistor 1 of approximately 1 MΩ and a further resistor 2 of 470 Ω. The voltage at the junction between the resistors 1 and 2, which substantially corresponds to the voltage of the capacitor 3, serves as the collector voltage for an npn-transistor 4 of the type BC 107. The emitter of transistor 4 is connected to ground. The base of the transistor 4 is connected to the collector through a resistor 5 of 4.7 MΩ. As a result of the high value of resistor 5 a lower base current is supplied and the collector-emitter voltage at the transistor 4 is prevented from increasing to an inadmissibly high value when the bias voltages are applied to the circuit.

The voltage of the capacitor 3 is applied, through a blocking capacitor 6 of 180 $\mu f$ to the control grid of a pentode tube 7. The cathode of the pentode 7 is connected to ground through the parallel connected combination of a resistor 8 of 390 Ω; and a shunting capacitor 9 of 100 $\mu f$. The anode branch of the pentode tube 7 is connected through the primary winding of a transformer 11 to a second supply source ++ of 240 volts. The secondary 12 of transformer 11 may be connected to the vertical deflection coils of a television receiver (not shown) to provide a vertical deflection sweep voltage. Between the anode of the pentode 7 and its control grind, a feedback coupling network 13 is connected. The desired nonlinearity of the control grid voltage which is required for the desired reflection is controlled by network 13. The control grid is connected to ground through a leakage resistor 14 of 2.2 MΩ.

The output transformer 11 contains a winding 15, having one end connected to ground. At the other end of winding 15 positive pulses are produced having a peak-to-peak value of approximately 70 volts during the flyback period of the deflection. These pulses are applied to the base of the transistor 4 through a resistor 16 of 6.8 kΩ and a capacitor 17 of 27 $\mu f$. The combination of resistor 16 and capacitor 17 has a differentiating action. As a result of this differentiating action the transistor 4 is made strongly conductive at the beginning of the flyback period. The capacitor 3 is thereby discharged through the resistor 2 and the collector-emitter path of the transistor 4, after which a new stroke period forward cycle may begin. As capacitor 3 is charged the voltage on the control grid of the tube 7 increases and its anode current increases. The increase in anode current results in an increase in the current through the deflection winding connected via the secondary winding 12. The shape of the deflection voltage curve is determined by the network 13.

A capacitor 18 of 330 $\mu f$ is connected in the emitter-base branch of the transistor 4 to increase the frequency stability of the circuit. Through the resistor 16 and the capacitor 17 the leading edge of the flyback pulse from winding 15 provides a positive voltage for the base of the transistor 4, thereby driving the transistor into conduction. The capacitor 17 is charged by the base current of the transistor 4 in such manner that its terminal connected to said base becomes negative with respect to the terminal connected to the resistor 16. With the beginning of the trailing edge of the pulse of the winding 15, the transistor 4 is cut off due to the weakly negative (stroke) voltage of approximately −10 volts on winding 15 and the negative charge on the side of capacitor 17 connected to the base of the transistor 4. The diode 19 of the type OA 81 is then conductive and charge from the capacitor 17 is transmitted to the capacitor 18 so that a negative voltage is formed at the latter. The capacitors 17 and 18 are discharged and reversely charged in the following interval through an adjustable resistor 20 of approximately 150 kΩ by a voltage from capacitor 22 having a positive polarity. At point A a grounded resistor 21 of 18 kΩ is connected in parallel with a capacitor 22 of 25 $\mu f$. The positive pulses of the winding 15 are applied, through a resistor 23 of 5.6 kΩ and a diode 24 of the type OA 81 to the resistor 21 and capacitor 22. This arrangement of capacitor 22, diode 24 and resistors 21 and 23 operates as a peak rectifier for the positive pulses from winding 15.

The capacitor voltage 18 is also conducted the base of the transistor 4, since the potential of the capacitor 17 at the base of the transistor 4 would discharge slowly through the ligh impedance of resistor 5. The diode 19 thus remains conductive and transmits the voltage of the capacitor 18 to the base of the transistor 4. As soon as this base voltage has become positive a few tenths of a volt, the transistor 4 is made conductive and the capacitor 3 is discharged. As a result of the discharge of capacitor 3 the anode current of the tube 7 decreases considerably and the positively directed flyback pulse appears at the winding 15 and resets the circuit to the beginning of the sweep interval.

The external synchronization is provided through the terminal 26, to which a signal containing positively directed synchronization pulses may be applied. By means of the series combination of diode 27, a resistor 28 of 68 kΩ and a positive voltage of for example +2.5 volts, the pulses are separated from low amplitude noise and are transmitted through the coupling capacitor 29 of 1 $\mu f$ through the terminal 30 to the base of the transistor 4.

The voltage of the capacitor 18 and the flyback pulses applied through the capacitor 17 result in an approximately sawtooth-like increasing voltage of approximately 3 V peak-to-peak at the base of the transistor 4. When external positive synchronizing pulses are applied the diode 19 is cut off so that the synchronizing pulses are not loaded by the capacitor 18. Therefore an excellent synchronization is possible using low energy pulses. The flyback of the circuit must be initiated by the synchronization pulses before the reverse charging of the capacitor 18 causes the base of transistor 4 to become positive with respect to the emitter.

Since the discharge voltage for the capacitor is derived from the flyback pulses variations in the capacitor charge resulting from a variation of the power supply voltage, will be accompanied by variations in the discharge voltage in such manner that the natural frequency of the circuit remains substantially constant.

With the pulse generator shown, an increasing current is formed in the tube 7 during the sweep interval succeeded by a sudden decrease of the anode current. This decrease in current is caused by the feedback coupling through the transistor 4 during the flyback pulse. It is therefore of importance that when the generator is connected into circuit, the transistor 4 is substantially cut off. The cutoff condition of transistor 4 is necessary in order that the capacitor 3 can be charged and the grid voltage of the tube 7 increased. During the charge of the capacitor 3 the collector voltage becomes more positive so that an increasing positive current flows to the base electrode through the resistor 5. When the flyback begins, the transistor 4 is controlled in the manner described by the voltage fed back by the winding 15.

The positive voltage required for reversely charging the capacitors 17 and 18 could open this transistor 4 as long as no charge is present at the capacitor 18 and thus impede a voltage increase at the capacitor 3. This undesired influence is avoided in that the reverse charging voltage at the capacitor 22 is built up only by rectification of the flyback pulses by means of the diode 24. When the apparatus is connected into circuit the transistor 4 thus is securely cut off since the collector voltage and the base voltage are substantially zero.

As described above, the capacitor 3 is then charged, during which the base of transistor 4 also receives a positive voltage through the resistor 5, until the transistor 4 is released and thus the discharge of the capacitor 3 and a decrease of the anode current of the tube 7 is introduced.

We claim:

1. A pulse generator circuit arrangement, comprising an amplifier having control and output terminals, means connected to the control terminal of the amplifier for forward biasing the amplifier, means connected intermediate the forward biasing means and the control terminal for delaying the forward biasing of the amplifier for a predetermined time, positive feedback means connected to the output terminal of the amplifier for providing a forward bias sustaining voltage in response to the forward bias condition of the amplifier, a first capacitor connected in series between the feedback means and the control terminal of the amplifier for conveying the sustaining voltage to the amplifier, a second grounded capacitor connected to the control terminal of the amplifier, terminal means for applying external synchronization pulses to the control terminal of the amplifier, and diode means connected intermediate the terminal means and the second capacitor for providing a high impedance path between the second capacitor and the terminal means in response to the synchronization pulses.

2. A pulse generator circuit arrangement comprising a transistor having base, emitter and collector terminals, the transistor having a forward biassed condition in response to a first voltage level on the base terminal, a first capacitor, a diode connecting one side of the first capacitor to the base terminal of the transistor, means for discharging the capacitor approximately proportional with time towards the first voltage level, whereby the transistor is forward biassed in response to the first voltage level on the first capacitor, pulse providing means responsive to the forward bias condition of the transistor for charging the first capacitor through the diode to a voltage less than the first voltage level whereby the transistor is cut off, and terminal means for applying synchronization pulses having a peak voltage greater than the voltage of the discharging means to the base of the transistor on the side of the diode remote from the first capacitor, thereby forward biassing the transistor and reverse biassing the diode.

3. A pulse generator as claimed in claim 2, wherein the pulse providing means comprises a pulse source responsive to the forward biassed condition of the transistor for producing a pulse having the polarity necessary for forward biassing the transistor, a second capacitor having one side connected to the base of the transistor and to the side of the diode remote from the first capacitor, and means for connecting the pulse source to the side of the second capacitor remote from the base of the transistor, whereby the second capacitor is charged through the base of the transistor toward a voltage necessary to cut off the transistor, the cutoff voltage from the second capacitor being conducted through the diode to the first capacitor in response to the trailing edge of the pulse from the pulse source.

4. A pulse generator as claimed in claim 3, wherein the means for discharging the first capacitor comprises means for rectifying the pulses from the pulse source, and means for connecting the rectified pulses to the side of the first capacitor proximate the diode.

5. A pulse generator as claimed in claim 11, wherein the pulse source is a secondary coil of a flyback transformer.

6. A pulse generator circuit arrangement as claimed in claim 2, wherein the capacity of the second capacitor is smaller than the capacity of the first capacitor.